United States Patent
Chen

(10) Patent No.: US 9,990,531 B2
(45) Date of Patent: Jun. 5, 2018

(54) READING DEVICE AND READING METHOD FOR FINGERPRINT SENSOR

(71) Applicant: Novatek Microelectronics Corp., Hsinchu (TW)

(72) Inventor: Ji-Ting Chen, Hsinchu County (TW)

(73) Assignee: Novatek Microelectronics Corp., Hsinchu (TW)

( * ) Notice: Subject to any disclaimer, the term of this patent is extended or adjusted under 35 U.S.C. 154(b) by 138 days.

(21) Appl. No.: 15/229,126

(22) Filed: Aug. 5, 2016

(65) Prior Publication Data
US 2018/0039816 A1  Feb. 8, 2018

(51) Int. Cl.
G06K 9/28 (2006.01)
G06K 9/00 (2006.01)

(52) U.S. Cl.
CPC ..... *G06K 9/00067* (2013.01); *G06K 9/00013* (2013.01)

(58) Field of Classification Search
CPC ...... H04N 5/3658; H04N 5/365; H04N 5/378; H04N 5/3575; G06K 9/00013–2009/0006
See application file for complete search history.

(56) References Cited

PUBLICATIONS

Martijn F. Snoeij et al., "A CMOS Imager With Column-Level ADC Using Dynamic Column Fixed-Pattern Noise Reduction", IEEE Journal of Solid-State Circuits, vol. 41, No. 12, Dec. 2006, pp. 3007-3015. (Year: 2006).*

* cited by examiner

*Primary Examiner* — Brian Werner
(74) *Attorney, Agent, or Firm* — JCIPRNET

(57) ABSTRACT

A reading device and a reading method for a fingerprint sensor are provided. The reading device includes a switching circuit, a plurality of analog front end (AFE) circuits and a calculation circuit. The switching circuit is coupled to a plurality of pixel units of the fingerprint sensor. The AFE circuits are coupled to the switching circuit. The calculation circuit is coupled to the AFE circuits for calculating a plurality of pixel data of the pixel units. For a first pixel unit among the pixel units, the calculation circuit reads the first pixel unit by using different AFE circuits among the AFE circuits, so as to obtain a plurality of first original sensing values of the first pixel unit. The calculation circuit calculates the pixel data of the first pixel unit according to the plurality of first original sensing values.

8 Claims, 2 Drawing Sheets

READING DEVICE AND READING METHOD FOR FINGERPRINT SENSOR

BACKGROUND

Field of the Invention

The invention is directed to a fingerprint recognition technique and more particularly, to a reading device and a reading method for a fingerprint sensor.

Description of Related Art

Fingerprint recognition plays an important role in biometric recognition systems. For the sake of information security, a fingerprint sensor may be disposed in an electronic apparatus (e.g., a handheld mobile phone). After a fingerprint is registered, the fingerprint sensor of the electronic apparatus may be capable of fingerprint verification. A similarity degree between the registered characteristic and a characteristic to be verified is compared, and thereby, whether they belong to the same fingerprint is determined, which is referred to as "fingerprint verification". The fingerprint verification function can be applied to border control, civil identification of offender status, business and home access control, public safety, data access, mobile communication, mobile payment or other information security applications.

The fingerprint sensor has a plurality of pixel units for sensing fingerprints. A conventional reading circuit reads sensing values corresponding to the pixel units in the fingerprint sensor by using analog front end (AFE) circuits. The relation between the AFE circuits and the pixel units is fixed in the conventional reading circuit. For example, a specific AFE circuit (e.g., a first AFE circuit) may be configured fixedly to read the sensing values of all the pixel units belonging to one column (e.g., a first column) in the fingerprint sensor, while another AFE circuit (e.g., a second AFE circuit) may be configured fixedly to read the sensing values of all the pixel units belonging to another column (e.g., a second column) in the fingerprint sensor. Ideally, a gain value of the first AFE circuit configured for reading the sensing values of the pixel units of the first column should be equal to a gain value of the second AFE circuit configured for reading the sensing values of the pixel units of the second column. However, due to process drift or other factors, the gain values of the AFE circuits may shift, which cause the AFE circuits of different columns to have different gains. For example, the gain value of the first AFE circuit configured for reading the sensing values of the pixel units of the first column is Gain 1, and the gain value of the second AFE circuit configured for reading the sensing values of the pixel units of the second column is Gain 2 (wherein the difference between Gain1 and Gain 2 exceeds a tolerance range). Thus, a frame signal output by the reading circuit of the fingerprint sensor has straight-stripe noise, and such straight-stripe noise is generally referred to as fixed pattern noise. The fixed pattern noise is commonly resulted from the shifts occurring to the gains of different AFE circuits.

SUMMARY

The invention provides a reading device and a reading method for a fingerprint sensor which can contribute to eliminating fixed pattern noise.

According to an embodiment of the invention, a reading device for a fingerprint sensor is provided. The reading device includes a switching circuit, a plurality of analog front end (AFE) circuits and a calculation circuit. The switching circuit is coupled to a plurality of pixel units of the fingerprint sensor. The AFE circuits are coupled to the switching circuit. The calculation circuit is coupled to the AFE circuits and configured to calculate a plurality of pixel data of the pixel units. For a first pixel unit among the pixel units, the calculation circuit reads the first pixel unit by using different AFE circuits among the AFE circuits, so as to obtain a plurality of first original sensing values of the first pixel unit. The calculation circuit calculates the pixel data of the first pixel unit by using the plurality of first original sensing values.

According to an embodiment of the invention, a reading method for a fingerprint sensor is provided. The reading method includes following steps. A switching circuit is disposed, wherein the switching circuit is coupled to a plurality of pixel units of the fingerprint sensor. A plurality of analog front end (AFE) circuits are disposed, wherein the AFE circuits are coupled to the switching circuit. A calculation circuit is disposed, wherein the calculation circuit is coupled to the AFE circuits. The calculation circuit reads a first pixel unit among the pixel units by using different AFE circuits among the AFE circuits, so as to obtain a plurality of first original sensing values of the first pixel unit. The calculation circuit calculates a pixel data of the first pixel unit according to the plurality of first original sensing values.

To sum up, in the reading device and the reading method for the fingerprint sensor provided by the embodiments of the invention, one pixel unit is read by using different AFE circuits, so as to obtain a plurality of original sensing values. According to the original sensing values, the calculation circuit can calculate the pixel data of the pixel unit. Thereby, the reading device and the reading method of the invention can contribute to eliminating fixed pattern noise.

To make the above features and advantages of the invention more comprehensible, embodiments accompanied with drawings are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
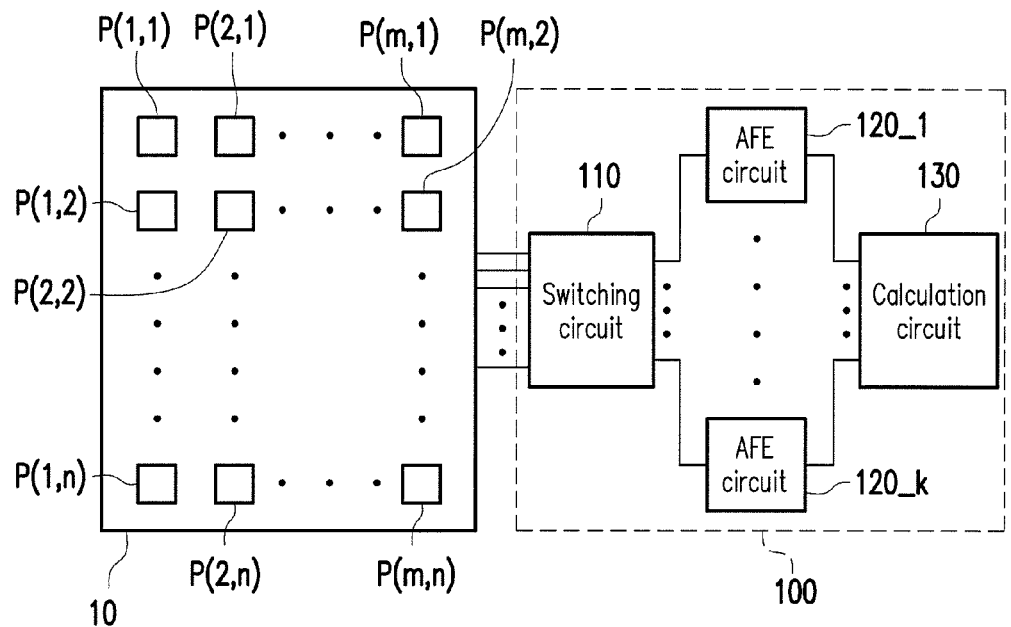
FIG. 1 is a schematic circuit block diagram illustrating a reading device for a fingerprint sensor according to an embodiment of the invention.

The term "couple (or connect)" herein (including the claims) are used broadly and encompass direct and indirect connection or coupling means. For example, if the disclosure describes a first apparatus being coupled (or connected) to a second apparatus, then it should be interpreted that the first apparatus can be directly connected to the second apparatus, or the first apparatus can be indirectly connected to the second apparatus through other devices or by a certain coupling means. Moreover, elements/components/steps with same reference numerals represent same or similar parts in the drawings and embodiments. Elements/components/notations with the same reference numerals in different embodiments may be referenced to the related description.

FIG. 1 is a schematic circuit block diagram illustrating a reading device 100 for a fingerprint sensor 10 according to an embodiment of the invention. The fingerprint sensor 10 illustrated in FIG. 1 has m*n pixel units, i.e., P(1,1), P(1,2), . . . , P(1,n), P(2,1), P(2,2), . . . , P(2,n), . . . , P(m,1), P(m,2), . . . and P(m,n). m and n are integers and may be determined based on design requirements. The pixel units P(1,1) to P(m,n) are arranged in an array on the fingerprint sensor 10. When a user's finger contacts the fingerprint sensor 10, the pixel units P(1,1) to P(m,n) may sense/capture a fingerprint of the finger. The reading device 100 includes a switching circuit 110, k analog front end (AFE) circuits (e.g., AFE circuits 120_1 to 120_k illustrated in FIG. 1) and a calculation circuit 130. k is an integer and may be determined based on design requirements.

The switching circuit 110 is coupled to the pixel units P(1,1) to P(m,n) of the fingerprint sensor 10. Input terminals of the AFE circuits 120_1 to 120_k are coupled to the switching circuit 110. The switching circuit 110 may provide/determine electrical connection relation between the pixel units P(1,1) to P(m,n) and the AFE circuits 120_1 to 120_k. For example, the switching circuit 110 may select one pixel unit from the pixel units P(1,1) to P(m,n) and electrically connects the selected pixel unit to the AFE circuit 120_1. The switching operation performed on the other AFE circuits by the switching circuit 110 may refer to the description related to the AFE circuit 120_1 and thus, will not be repeated hereinafter. The AFE circuits 120_1 to 120_k may be conventional AFE circuits or the like, and thus, will not be repeated hereinafter. An input terminal of the calculation circuit 130 is coupled to output terminals of the AFE circuits 120_1 to 120_k. The calculation circuit 130 may calculate a plurality of pixel data of the pixel units P(1,1) to P(m,n).

Figure 2:
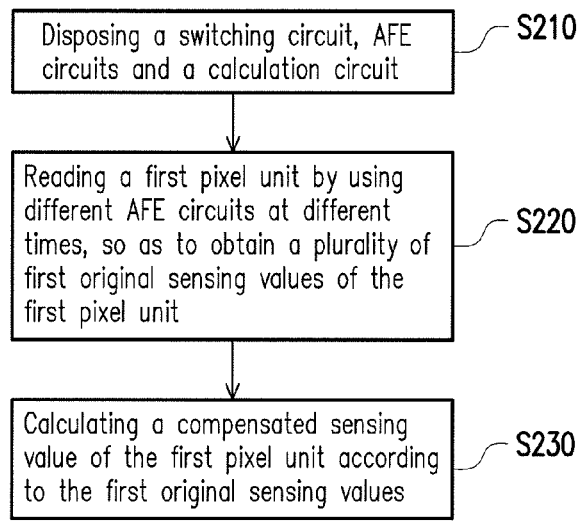
FIG. 2 is a flowchart illustrating a reading method for the fingerprint sensor according to an embodiment of the invention.

FIG. 2 is a flowchart illustrating a reading method for the fingerprint sensor 10 according to an embodiment of the invention. Referring to FIG. 1 and FIG. 2, in step S210, the switching circuit 110, the AFE circuits 120_1 to 120_k and the calculation circuit 130 are disposed in the reading device 100. In step S220, the calculation circuit 130 may read a specific pixel unit (e.g., a first pixel unit) among the pixel units P(1,1) to P(m,n) by using different AFE circuits among the AFE circuits 120_1 to 120_k at different times (or at the same time), so as to obtain a plurality of first original sensing values. According to the first original sensing values obtained in step S220, the calculation circuit 130, in step S230, may calculate a pixel data of the first pixel unit.

For instance, for the first pixel unit (e.g., the pixel unit P(2,2)) among the pixel units P(1,1) to P(m,n), the calculation circuit 130 may read the pixel unit P(2,2) by using the AFE circuit 120_1 at a first time to obtain an original sensing value SA of the pixel unit P(2,2). The calculation circuit 130 may also read the same pixel unit P(2,2) by using the AFE circuit 120_2 (which is not shown in FIG. 1) at a second time to obtain another original sensing value SB of the pixel unit P(2,2). The calculation circuit 130, in step S230, may calculate the pixel data of the pixel unit P(2,2) according to the original sensing values SA and SB. In some embodiments, the calculation circuit 130, in step S230, may calculate an average value of the original sensing values SA and SB to serve it as the pixel data of the pixel unit P(2,2). In some other embodiments, the calculation circuit 130, in step S230, may calculate a weighted average value of the original sensing values SA and SB to serve it as the pixel data of the pixel unit P(2,2). In yet other embodiments, the calculation circuit 130, in step S230, may substitute the original sensing values SA and SB into a conversion equation to calculate the pixel data of the pixel unit P(2,2). The conversion equation may be determined based on design requirement. In still other embodiments, the calculation circuit 130, in step S230, may use a lookup table to convert the original sensing values SA and SB into the pixel data of the pixel unit P(2,2).

In the reading device 100 and the reading method for the fingerprint sensor 10 of the present embodiment, the same pixel unit (e.g., the pixel unit P(2,2)) is read by using different AFE circuits at different times (or at the same time) to obtain a plurality of original sensing values. According to the original sensing values, the calculation circuit 130 may calculate the pixel data of the pixel unit P(2,2). Thereby, the reading device 100 and the reading method of the present embodiment may contribute to eliminating fixed pattern noise.

Figure 3:
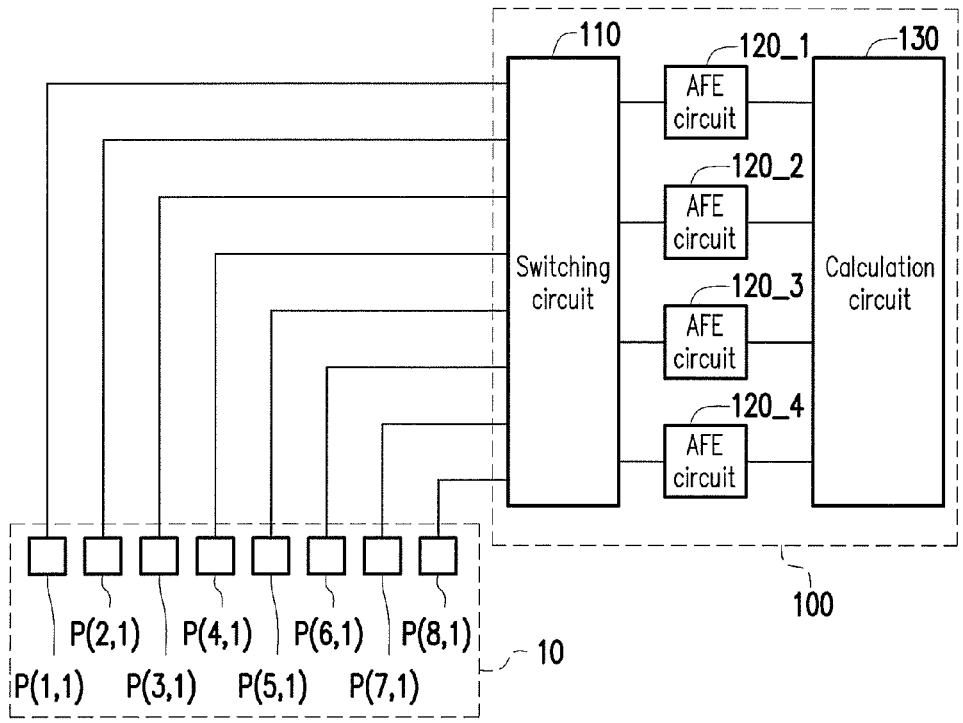
FIG. 3 is a schematic circuit block diagram illustrating the reading device depicted in FIG. 1 according to an embodiment of the invention.

FIG. 3 is a schematic circuit block diagram illustrating the reading device 100 depicted in FIG. 1 according to an embodiment of the invention. In the embodiment illustrated in FIG. 3, the fingerprint sensor 10 illustrated has pixel units P(1,1), P(2,1), P(3,1), P(4,1), P(5,1), P(6,1), P(7,1) and P(8,1). The other pixel units of the fingerprint sensor 10 illustrated in FIG. 1 may be inferred in accordance with the description related to FIG. 3 and thus, will not be repeated hereinafter. In the embodiment illustrated in FIG. 3, the reading device 100 includes the switching circuit 110, a first AFE circuit 120_1, a second AFE circuit 120_2, a third AFE circuit 120_3, a fourth AFE circuit 120_4 and the calculation circuit 130. The switching circuit 110 is coupled to the pixel units P(1,1) to P(8,1) of the fingerprint sensor 10 through different conductive wires. Input terminals of the AFE circuits 120_1 to 120_4 are coupled to the switching circuit 110. The input terminal of the calculation circuit 130 is coupled to output terminals of the AFE circuits 120_1 to 120_4.

Figure 4:
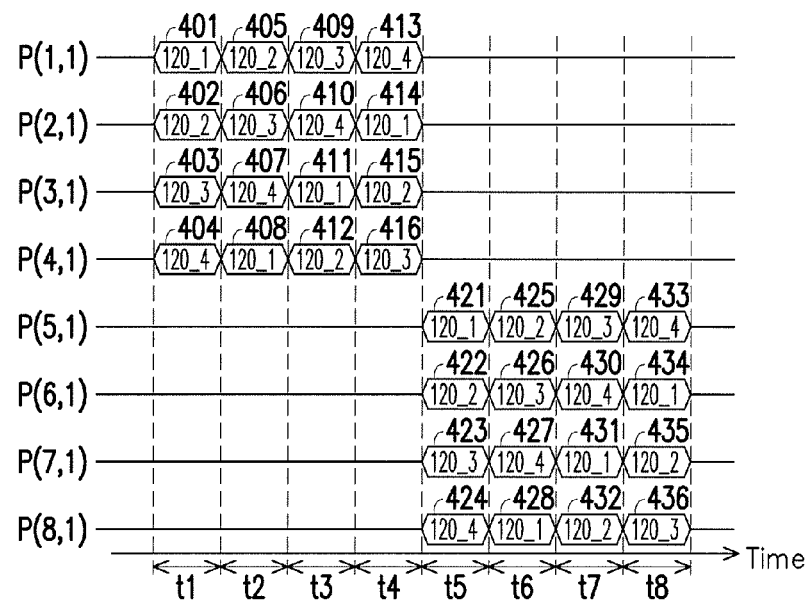
FIG. 4 is a schematic operation timing diagram of the reading device depicted in FIG. 3 according to an embodiment of the invention.

FIG. 4 is a schematic operation timing diagram of the reading device 100 depicted in FIG. 3 according to an embodiment of the invention. The lateral axis illustrated in FIG. 4 represent the time. Referring to FIG. 3 and FIG. 4, at a first time t1, the calculation circuit 130 reads the pixel unit P(1,1) by using the first AFE circuit 120_1 to obtain a first sensing value 401, reads the pixel unit P(2,1) by using the second AFE circuit 120_2 to obtain a second sensing value 402, reads the pixel unit P(3,1) by using the third AFE circuit 120_3 to obtain a third sensing value 403, and reads the pixel unit P(4,1) by using the fourth AFE circuit 120_4 to obtain a fourth sensing value 404. At a second time t2, the calculation circuit 130 reads the pixel unit P(1,1) by using the second AFE circuit 120_2 to obtain a fifth sensing value 405, reads the pixel unit P(2,1) by using the third AFE circuit 120_3 to obtain a sixth sensing value 406, reads the pixel unit P(3,1) by using the fourth AFE circuit 120_4 to obtain a seventh sensing value 407, and reads the pixel unit P(4,1) by using the first AFE circuit 120_1 to obtain an eighth sensing value 408. At a third time t3, the calculation circuit 130 reads the pixel unit P(1,1) by using the third AFE circuit 120_3 to obtain a ninth sensing value 409, reads the pixel unit P(2,1) by using the fourth AFE circuit 120_4 to obtain a tenth sensing value 410, reads the pixel unit P(3,1) by using the first AFE circuit 120_1 to obtain an eleventh sensing value 411, and reads the pixel unit P(4,1) by using the second AFE circuit 120_2 to obtain a twelfth sensing value 412. At a fourth time t4, the calculation circuit 130 reads the pixel unit P(1,1) by using the fourth AFE circuit 120_4 to obtain a thirteenth sensing value 413, reads the pixel unit P(2,1) by using the first AFE circuit 120_1 to obtain a fourteenth sensing value 414, reads the pixel unit P(3,1) by using the second AFE circuit 120_2 to obtain a fifteenth sensing value 415, and reads the pixel unit P(4,1) by using the third AFE circuit 120_3 to obtain a sixteenth sensing value 416.

After the sensing values 401 to 406 are obtained, the calculation circuit 130 may calculate an average value of the first sensing value 401, the fifth sensing value 405, the ninth sensing value 409 and the thirteenth sensing value 413 to serve it as the pixel data of the pixel unit P(1,1). The calculation circuit 130 may calculate an average value of the second sensing value 402, the sixth sensing value 406, the tenth sensing value 410 and the fourteenth sensing value 414 to serve it as the pixel data of the pixel unit P(2,1). The calculation circuit 130 may calculate an average value of the third sensing value 403, the seventh sensing value 407, the eleventh sensing value 411 and the fifteenth sensing value 415 to serve it as the pixel data of the pixel unit P(3,1). The calculation circuit 130 may calculate an average value of the fourth sensing value 404, the eighth sensing value 408, the twelfth sensing value 412 and the sixteenth sensing value 416 to serve it as the pixel data of the pixel unit P(4,1). In this way, the calculation circuit 130 may calculate the plurality of pixel data of the pixel units P(1,1) to P(4,1). The reading device 100 illustrated in FIG. 3 may contribute to eliminating fixed pattern noise since the AFE circuits 120_1 to 120_4 do not have fixed relation with the pixel units P(1,1) to P(4,1).

After the plurality of pixel data of the pixel units P(1,1) to P(4,1) are obtained, at a time t5, the calculation circuit 130 reads the pixel unit P(5,1) by using the first AFE circuit 120_1 to obtain a sensing value 421, reads the pixel unit P(6,1) by using the second AFE circuit 120_2 to obtain a sensing value 422, reads the pixel unit P(7,1) by using the third AFE circuit 120_3 to obtain a sensing value 423, and reads the pixel unit P(8,1) by using the fourth AFE circuit 120_4 to obtain a sensing value 424. At a time t6, the calculation circuit 130 reads the pixel unit P(5,1) by using the second AFE circuit 120_2 to obtain a sensing value 425, reads the pixel unit P(6,1) by using the third AFE circuit 120_3 to obtain a sensing value 426, reads the pixel unit P(7,1) by using the fourth AFE circuit 120_4 to obtain a sensing value 427, and reads the pixel unit P(8,1) by using the first AFE circuit 120_1 to obtain a sensing value 428. At a time t7, the calculation circuit 130 reads the pixel unit P(5,1) by using the third AFE circuit 120_3 to obtain a sensing value 429, reads the pixel unit P(6,1) by using the fourth AFE circuit 120_4 to obtain a sensing value 430, reads the pixel unit P(7,1) by using the first AFE circuit 120_1 to obtain a sensing value 431, and reads the pixel unit P(8,1) by using the second AFE circuit 120_2 to obtain a sensing value 432. At a time t8, the calculation circuit 130 reads the pixel unit P(5,1) by using the fourth AFE circuit 120_4 to obtain a sensing value 433, reads the pixel unit P(6,1) by using the first AFE circuit 120_1 to obtain a sensing value 434, reads the pixel unit P(7,1) by using the second AFE circuit 120_2 to obtain a sensing value 435, and reads the pixel unit P(8,1) by using the third AFE circuit 120_3 to obtain a sensing value 436.

After the sensing values 421 to 436 are obtained, the calculation circuit 130 may calculate an average value of the sensing values 421, 425, 429 and 433 to serve it as the pixel data of the pixel unit P(5,1), calculate an average value of the sensing values 422, 426, 430 and 434 to serve it as the pixel data of the pixel unit P(6,1), calculate an average value of the sensing values 423, 427, 431 and 435 to serve it as the pixel data of the pixel unit P(7,1) and calculate an average value of the sensing values 424, 428, 432 and 436 to serve it as the pixel data of the pixel unit P(8,1). In this way, the calculation circuit 130 may calculate the plurality of pixel data of the pixel units P(5,1) to P(8,1). The reading device 100 illustrated in FIG. 3 may contribute to eliminating fixed pattern noise since the AFE circuits 120_1 to 120_4 do not have fixed relation with the pixel units P(5,1) to P(8,1).

In some other embodiments, taking the pixel unit P(1,1) as an example, the calculation circuit 130 may repeatedly read the pixel unit P(1,1) by using the first AFE circuit 120_1 at different times to obtain sensing values S11, S12, S13 and S14. After the sensing values S11, S12, S13 and S14 are obtained, the calculation circuit 130 may repeatedly read the pixel unit P(1,1) by using the second AFE circuit 120_2 at different times to obtain sensing values S21, S22, S23 and S24. After the sensing values S21, S22, S23 and S24 are obtained, the calculation circuit 130 may repeatedly read the pixel unit P(1,1) by using the third AFE circuit 120_3 at different times to obtain sensing values S31, S32, S33 and S34. After the sensing values S31, S32, S33 and S34 are obtained, the calculation circuit 130 may repeatedly read the pixel unit P(1,1) by using the fourth AFE circuit 120_4 at different times to obtain sensing values S41, S42, S43 and S44. The calculation circuit 130 may calculate (S11+S12+S13+S14+S21+S22+S23+S24+S31+S32+S33+S34+S41+S42+S43+S44)/16, and serve the calculated value as the pixel data of the pixel unit P(1,1). The other pixel units may be inferred by analog in accordance with the description related to the pixel unit P(1,1) and thus, will not be repeated hereinafter. Thus, the reading device 100 illustrated in FIG. 3 may contribute to eliminating fixed pattern noise.

It should be noted that in different application scenarios, related functions of the calculation circuit 130 may be implemented in a form of software, firmware or hardware by using general programming languages (e.g., C or C++), hardware description languages (e.g., Verilog HDL or VHDL) or other suitable programming languages. The software (or firmware) capable of executing the related functions may be deployed in any known computer-accessible medias, such as magnetic tapes, semiconductor memories, discs or compact discs (e.g., CD-ROMs or DVD-ROMs) or may be transmitted through Internet, wired communication, wireless communication, or other communication media. The software (or firmware) may be stored in an accessible medium of a computer, such that a processor of the computer may access/execute programming codes of the software (or firmware). Moreover, the device and the method of the invention may be implemented through a combination of hardware and software.

Although the invention has been disclosed by the above embodiments, they are not intended to limit the invention. It will be apparent to one of ordinary skill in the art that modifications and variations to the invention may be made without departing from the spirit and scope of the invention. Therefore, the scope of the invention will be defined by the appended claims.

What is claimed is:
1. A reading device for a fingerprint sensor, comprising:
   a switching circuit, coupled to a plurality of pixel units of the fingerprint sensor;

a plurality of analog front end (AFE) circuits, coupled to the switching circuit; and a calculation circuit, coupled to the AFE circuits, and configured to calculate a plurality of pixel data of the pixel units, wherein for a first pixel unit among the pixel units, the calculation circuit reads the first pixel unit by using different AFE circuits among the AFE circuits, so as to obtain a plurality of first original sensing values of the first pixel unit, and calculates the pixel data of the first pixel unit by using the plurality of first original sensing values.

2. The reading device according to claim 1, wherein the calculation circuit calculates an average value of the plurality of first original sensing values to serve it as the pixel data of the first pixel unit.

3. The reading device according to claim 1, wherein the AFE circuits comprises a first AFE circuit, a second AFE circuit, a third AFE circuit and a fourth AFE circuit; the pixel units comprises the first pixel unit, a second pixel unit, a third pixel unit and a fourth pixel unit;

at a first time, the calculation circuit reads the first pixel unit, the second pixel unit, the third pixel unit and the fourth pixel unit respectively by using the first AFE circuit, the second AFE circuit, the third AFE circuit and the fourth AFE circuit to obtain a first sensing value, a second sensing value, a third sensing value and a fourth sensing value;

at a second time, the calculation circuit reads the first pixel unit, the second pixel unit, the third pixel unit and the fourth pixel unit respectively by using the second AFE circuit, the third AFE circuit, the fourth AFE circuit and the first AFE circuit to obtain a fifth sensing value, a sixth sensing value, a seventh sensing value and an eighth sensing value;

at a third time, the calculation circuit reads the first pixel unit, the second pixel unit, the third pixel unit and the fourth pixel unit respectively by using the third AFE circuit, the fourth AFE circuit, the first AFE circuit and the second AFE circuit to obtain a ninth sensing value, a tenth sensing value, an eleventh sensing value and a twelfth sensing value; and at a fourth time, the calculation circuit reads the first pixel unit, the second pixel unit, the third pixel unit and the fourth pixel unit respectively by using the fourth AFE circuit, the first AFE circuit, the second AFE circuit and the third AFE circuit to obtain a thirteenth sensing value, a fourteenth sensing value, a fifteenth sensing value and a sixteenth sensing value.

4. The reading device according to claim 3, wherein the calculation circuit calculates an average value of the first sensing value, the fifth sensing value, the ninth sensing value and the thirteenth sensing value to serve it as the pixel data of the first pixel unit, calculates an average value of the second sensing value, the sixth sensing value, the tenth sensing value and the fourteenth sensing value to serve it as the pixel data of the second pixel unit, calculates an average value of the third sensing value, the seventh sensing value, the eleventh sensing value and the fifteenth sensing value to serve it as the pixel data of the third pixel unit, and calculates an average value of the fourth sensing value, the eighth sensing value, the twelfth sensing value and the sixteenth sensing value to serve it as the pixel data of the fourth pixel unit.

5. A reading method for a fingerprint sensor, comprising:
disposing a switching circuit, wherein the switching circuit is coupled to a plurality of pixel units of the fingerprint sensor;

disposing a plurality of analog front end (AFE) circuits, wherein the AFE circuits are coupled to the switching circuit;

disposing a calculation circuit, wherein the calculation circuit is coupled to the AFE circuits;

reading a first pixel unit among the pixel units by using different AFE circuits among the AFE circuits by the calculation circuit, so as to obtain a plurality of first original sensing values of the first pixel unit; and calculating a pixel data of the first pixel unit according to the plurality of first original sensing values by the calculation circuit.

6. The reading method according to claim 5, wherein the step of calculating the pixel data of the first pixel unit comprises:

calculating an average value of the plurality of first original sensing values to serve it as the pixel data of the first pixel unit by the calculation circuit.

7. The reading method according to claim 5, further comprising:

reading the first pixel unit by using a first AFE circuit among the AFE circuits to obtain a first sensing value at a first time by the calculation circuit;

reading a second pixel unit among the pixel units by using a second AFE circuit among the AFE circuits to obtain a second sensing value at the first time by the calculation circuit;

reading a third pixel unit among the pixel units by using a third AFE circuit among the AFE circuits to obtain a third sensing value at the first time by the calculation circuit;

reading a fourth pixel unit among the pixel units by using a fourth AFE circuit among the AFE circuits to obtain a fourth sensing value at the first time by the calculation circuit;

reading the first pixel unit by using the second AFE circuit to obtain a fifth sensing value at a second time by the calculation circuit;

reading the second pixel unit by using the third AFE circuit to obtain a sixth sensing value at the second time by the calculation circuit;

reading the third pixel unit by using the fourth AFE circuit to obtain a seventh sensing value at the second time by the calculation circuit;

reading the fourth pixel unit by using the first AFE circuit to obtain an eighth sensing value at the second time by the calculation circuit;

reading the first pixel unit by using the third AFE circuit to obtain a ninth sensing value at a third time by the calculation circuit;

reading the second pixel unit by using the fourth AFE circuit to obtain a tenth sensing value at the third time by the calculation circuit;

reading the third pixel unit by using the first AFE circuit to obtain an eleventh sensing value at the third time by the calculation circuit;

reading the fourth pixel unit by using the second AFE circuit to obtain a twelfth sensing value at the third time by the calculation circuit;

reading the first pixel unit by using the fourth AFE circuit to obtain a thirteenth sensing value at a fourth time by the calculation circuit;

reading the second pixel unit by using the first AFE circuit to obtain a fourteenth sensing value at the fourth time by the calculation circuit;

reading the third pixel unit by using the second AFE circuit to obtain a fifteenth sensing value at the fourth time by the calculation circuit; and reading the fourth pixel unit by using the third AFE circuit to obtain a sixteenth sensing value at the fourth time by the calculation circuit.

8. The reading method according to claim 7, further comprising:

calculating an average value of the first sensing value, the fifth sensing value, the ninth sensing value and the thirteenth sensing value to serve it as the pixel data of the first pixel unit by the calculation circuit;

calculating an average value of the second sensing value, the sixth sensing value, the tenth sensing value and the fourteenth sensing value to serve it as a pixel data of the second pixel unit by the calculation circuit;

calculating an average value of the third sensing value, the seventh sensing value, the eleventh sensing value and the fifteenth sensing value to serve it as a pixel data of the third pixel unit by the calculation circuit; and calculating an average value of the fourth sensing value, the eighth sensing value, the twelfth sensing value and the sixteenth sensing value to serve it as a pixel data of the fourth pixel unit by the calculation circuit.

* * * * *